Sept. 22, 1925.  1,554,539
T. H. WEINHOUSE
AUTOMATIC STEAM VAPORIZER
Filed Feb. 18, 1924
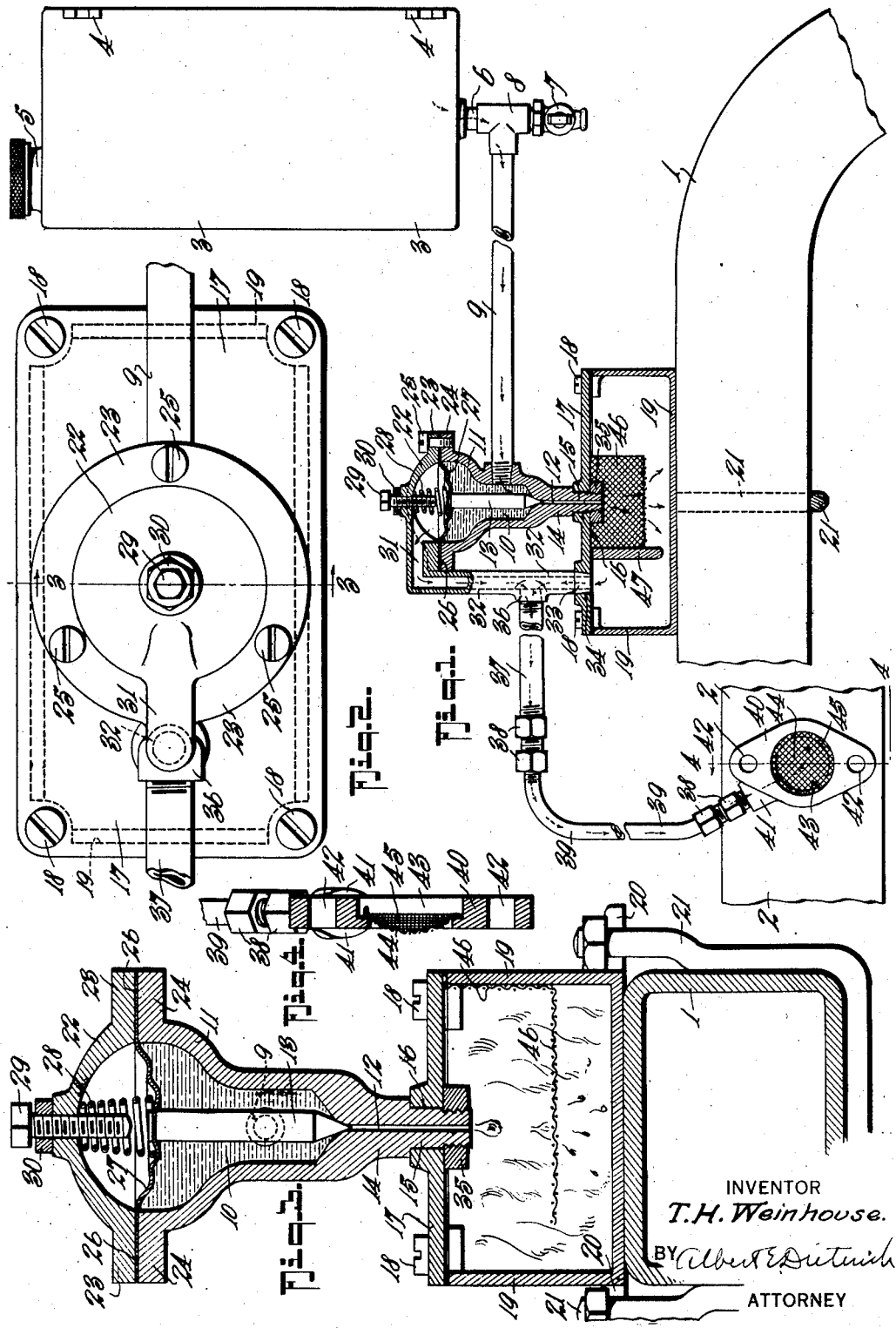
INVENTOR
T.H. Weinhouse.
BY
ATTORNEY Patented Sept. 22, 1925.

1,554,539

UNITED STATES PATENT OFFICE.

THEODORE H. WEINHOUSE, OF PITTSBURGH, PENNSYLVANIA; ALICE F. WEINHOUSE ADMINISTRATRIX OF SAID THEODORE H. WEINHOUSE, DECEASED.

AUTOMATIC STEAM VAPORIZER.

Application filed February 18, 1924. Serial No. 693,713.

*To all whom it may concern:*

Be it known that I, THEODORE H. WEINHOUSE, a citizen of the United States, residing at Pittsburgh, in the county of Allegheny and State of Pennsylvania, have invented certain new and useful Improvements in Automatic Steam Vaporizers, of which the following is a specification.

The invention generally relates to vaporizers for use in connection with internal combustion engines for the purpose of delivering aqueous vapor into the cylinders thereof, with the gaseous fuel charges delivered thereinto from the carbureter, to thereby effect fuel economy and more efficient operation.

Many types of vaporizers have been designed for the general purpose stated but all such types coming under my observation have been impractical for various reasons; many, because they are of a structure too complex, and such as require alterations to the engine parts in effecting the application thereof; many, because they will not operate at all for the purposes for which they are intended; many, which will only operate effectively under suitable conditions, and which must be continuously and mechanically adjusted to meet the requirements of the running engine; and still others which are impractical because of the very theories upon which they operate and the manner of carrying those theories into effect, come even making it possible to deliver small quantities of water into the engine cylinders or carbureter.

It is therefore the general object of my invention to provide a new and improved construction of vaporizer, which may be readily attached to cooperative relation with the coacting engine parts without any alteration to them whatever; and which, when so applied will automatically supply just the amount of aqueous vapor needed by the engine to effect the most efficient running thereof under varied speed conditions.

In its more detailed nature the invention resides in the new and improved structural features of my vaporizer whereby the same may be quickly, and with ease, attached to the coacting engine parts without any alteration thereof whatever; in which water is continually and automatically supplied in amount in accordance with the needs of the running condition of the engine and instantaneously converted into steam to be delivered into the engine as a part of the fuel charges passing thereinto from the carbureter.

With the above and other objects in view, the invention still further resides in those novel details of construction, combination and arrangement of parts all of which will be first fully described, then be particularly pointed out in the appended claims, reference being had to the accompanying drawing, in which:—

Figure 1 is a somewhat diagrammatic part central section and elevation illustrating the invention as applied for use.

Figure 2 is an enlarged plan view of the generating box and the control housing.

Figure 3 is a cross section on the line 3—3 on Figure 2.

Figure 4 is a cross section on the line 4—4 on Figure 1.

In carrying out my invention the same is constructed to be readily applicable as an attachment in cooperation with the exhaust manifold and the fuel passage between the carbureter and the intake manifold, the nature of the parts being such that the application may be made by the owner of the machine in a very few moments, and in a practical manner, whether he be a mechanic or not, and without any alteration whatever of the said parts of the automobile structure with which the invention cooperates. In the digrammatic illustration of the application of the invention shown in Figure 1 a portion of the exhaust manifold of an automobile is diagrammatically indicated by the numeral 1, and the numeral 2 may serve to diagrammatically indicate a portion of the carbureter.

I provide a water supply tank 3 which may be provided with extending ears 4, which may serve as a connecting medium whereby the tank may be operatively secured upon the dash-board of the machine or any other suitable support. The tank includes a suitable filler neck 5 which is provided with a screw closure cap and includes, projecting from the bottom thereof, a flow connection 6 which joins with a drain cock 7 through the medium of the T connection 8.

A water conduit pipe 9 is connected with the flow connection 6 through the T connection 8, and the said pipe is in communication with the water chamber 10 of the control housing 11, which said housing includes a downwardly extending small fluid passage bore 12, adapted to form a seat for the needle control valve 13 and a passage for the flow of water, which flow is controlled by the said valve.

The shank 14 of the housing, through which the fluid passage 12 passes, is provided with a reduced and threaded shank 15, which is adapted to pass through the hole 16 provided therefor in the cover plate 17 which is secured at its corners by cap screws 18 to form a top closure for the hollow shell-like steam generating box 19. A gasket may be inserted between the plate 17 and the sides of the box 19 to render the same steam tight.

The generating box 19 is provided with laterally extending ears 20 which serve as a connecting means for receiving the U-clamp 21, through the medium of which the said generating box may be tightly secured upon the exhaust manifold in the manner illustrated in Figures 1 and 3 of the drawing, and for the purpose of being heated thereby when the engine is running.

The housing 11 is closed by a dome cover cap 22 which includes a flange 23 adapted to be secured to the flange 24 of the housing by the three cap screws 25, see Figures 1 and 2.

A sensitive flexible diaphragm 26 is mounted in the housing by reason of having the annular flange portion thereof tightly clamped between the flanges 23 and 24, the flexible part 27 of the diaphragm being rigidly secured to the top of the needle valve 13 so that movement of the flexible diaphragm will effect a moving of the needle valve to seat or unseat the same. By reference to Figure 1 of the drawing it will be observed that the diaphragm serves to separate the housing into a water compartment, below the diaphragm, and a suction compartment above the diaphragm, and rendering each compartment entirely independent of any communication with the other compartment.

A spring 28 is provided in the dome cover cap 22 for effecting a positive seating of the valve 13, and a stop screw 29 is also provided for limiting the movement of the flexible portion 27 of the diaphragm; a jamb nut 30 being also provided to secure the screw 29 at the desired adjustment thereof.

The dome cover cap 22 is provided with an extension cast integral therewith and which is bored to provide a lateral suction passage 31 which communicates with the combined suction passage and suction steam conducting passage formed in a downwardly extending member 32 also formed integral with the cap 22 and extending downwardly from the edge of the flange thereof, the said member being provided at its bottom end with a taper 33 adapted to tightly fit the tapered bore 34 provided therefor in the cover plate 17.

A securing nut 35 is provided and is adapted to engage the threaded shank 15 to securely hold both the housing 11 and the member 32, extending from the cap therefor, in fixed relation with the cover plate 17.

By reason of providing the downwardly extending member 32 as an integral part of the cover cap 22 and by providing that member with a tapered end, it is possible to secure the housing and the member in cooperative relation upon the generating box 19 by the single, simple, clamp nut adjustment 35.

It will also be observed that the integrally cast member 32 does away with all pipe connections which would ordinarily have to be used to make a similar connection and also provides for an absolutely fixed relation between the axes of the said member and the threaded extension 15 so that these parts will perfectly match the positions of the bores 16 and 34, which would not be the case if pipe couplings were used, unless very great care was used in threading and connecting said couplings.

The downwardly extending member 32 is provided with an enlargement 36 which serves as a connection for the suction pipe 37 which is connected, through the medium of the unions 38 and the pipe line 39, with flat connector plate 40 adapted to be inserted between the flanges of the carbureter and the intake manifold of the engine.

By thus providing the flat connector plate 40 and the U-clamp securing means 21 it is possible to quickly and effectively apply my steam vaporizing attachment in cooperative relation upon most any type of automobile engine without any alteration of the parts thereof whatever. The plate 40 is provided with holes 42 in the opposite ears thereof to accommodate the passage of bolts usually used to secure the flanges of the carbureter and intake manifold.

The connector plate 40 is provided with a connecting boss 41 with which the connecting means 38 and 39 are in communication and the aperture of this boss delivers into the center bore 43 thereof which serves as a seat for a filter screen 44 held to position by the flange 45.

A splasher screen plate 46 may be provided and positioned with the angled flange thereof clamped between the cover plate 17 and the generating box 19 in the position illustrated in Figures 1 and 3. While the use of this screen plate is unnecessary it may be desired and when used will serve to effectively break up the drops of water as they fall thereupon and serve to aid in the instantaneous generation of steam.

In operation, water will flow from the tank 3 through the conduit pipe 9 and into the water chamber 10 of the housing 11. The suction of the engine will cause a lifting of the diaphragm 27 and a corresponding unseating of the valve 13, to permit a passage of water from the chamber 10 through the passageway 12; the degree of lift of the valve and consequent water passage being in accordance with the exact needs of the running condition of the engine as the degree of suction will naturally vary in accordance with the degree of speed of the engine as will also the need for the aqueous vapor, generated by the reason of the water passage, increase.

As the water leaves the discharge end of the passageway 12, drop by drop, it will fall upon the screen plate 46, and will be separated or broken up thereby in a manner for distributing the particles thereof over a greater area of the bottom of the generating box 19; it being understood that the bottom of this box is in a highly heated condition by reason of its position in contact with the exhaust manifold 1.

Thus the water, passing drop by drop from the passage 12, will be instantaneously converted into steam which will be carried into the engine by the same suction which effected the adjustment of the needle valve 13, through the lower end of the passageway in the member 32, through the pipe lines 37 and 39, through the filter screen 44 into the intake manifold.

By reason of providing the connector plate 40 with the boss 41 thereof provided in the angle indicated, it is possible to make four adjustments of this plate in order to enable proper connecting up of the device without any danger whatever of the piping 39 interfering with the carbureter control connections.

It should be understood that the action of my invention is wholly automatic, under engine suction control, and that the stop screw and nut devices 29, 30 are merely adjustable stop devices which, when once set to accord with the requirements of the particular engine, need not be further manipulated to aid the perfect operation of my device.

A cross wall on partition 47 may be provided between the water passage 12 and the steam duct in the member 32 and extending across the box 19 in a manner for leaving a restricted steam passage between the bottom of the same and the highly heated box bottom. In this manner the generated steam is caused to pass through the restricted passageway and therefore is somewhat superheated before leaving the said box through the discharge duct by reason of the forced contact thereof with the highly heated bottom after generation.

In the foregoing description and in the drawing I have disclosed a structure which may be quickly and conveniently applied for use in connection with most all types of internal combustion engines without any alterations thereto whatever, in which the parts are of simple construction and capable of being manufactured at a very low cost, in which the parts are so constructed and cooperatively arranged as to operate efficiently, and in which the probability of breakage or displacement of the parts is reduced to the minimum; also one in which steam for supplying the desired aqueous vapor to the engine cylinders with the fuel charge is instantaneously generated and in a manner whereby all possibility of delivering water particles into the intake manifold is rendered impossible. By actual experiment I have found that the use of my attachment greatly increases the efficiency of a motor and effects a fifty-five per cent fuel economy.

From the foregoing description, taken in connection with the accompanying drawing, it is thought the novel details of construction, the manner of operation and the advantages of my invention will be readily apparent to those skilled in the art.

What I claim is:

1. In a device of the character described, a steam generator box, a housing including a water passage in communication with the box, a water supply tank, a conduit for supplying water from the tank to the housing, a dome cover-cap for the housing, a diaphragm adapted to be secured between cover-cap and housing and to cooperate therewith in forming a water chamber and a suction chamber, means for supplying water from the water chamber to the box in limited quantity to be instantly generated into steam, a member extending down from the cover-cap, and having a tapered lower end and a composite suction and steam delivery duct therethrough, means for providing communication between the composite duct and the intake manifold of an engine, a threaded shank formed on the housing and adapted to extend through a hole in the box top, and a nut for securing the housing to position and the tapered end fixed in a hole therefor provided in said box top.

2. In a device of the character described, a steam generator box, a housing including a water passage in communication with the box, a water supply tank, a conduit for supplying water from the tank to the housing, a dome cover-cap for the housing, a diaphragm adapted to be secured between cover-cap and housing and to cooperate therewith in forming a water chamber and a suction chamber, means for supplying water from the water chamber to the box in limited quantity to be instantly generated into steam, the said means comprising a needle valve secured to the diaphragm to be automatically moved therewith by engine suction and for cooperating with the water passage of the housing in regulating the flow of water therefrom, a member extending down from the cover-cap and having a tapered lower end and a composite suction and steam delivery duct therethrough, means for providing communication between the composite duct and the intake manifold of an engine, a threaded shank formed in the housing and adapted to extend through a hole in the box top, and a nut for securing the housing to position and the tapered end fixed in a hole therefor provided in said box top.

3. In a device of the character described, a steam generator box, a housing including a water passage in communication with the box, a water supply tank, a conduit for supplying water from the tank to the housing, a dome cover-cap for the housing, a diaphragm adapted to be secured between cover-cap and housing and to cooperate therewith in forming a water chamber and a suction chamber, means for suppying water from the water chamber to the box in limited quantity to be instantly generated into steam, the said means comprising a needle valve secured to the diaphragm to be automatically moved therewith by engine suction and for cooperating with the water passage of the housing in regulating the flow of water therefrom, means for distributing the water supplied to the box over a considerable area of the highly heated bottom thereof comprising a splasher screen plate flange connected within the said box, a member extending down from the cover-cap and having a tapered lower end and a composite suction and steam delivery duct therethrough, means for providing communication between the composite duct and the intake manifold of an engine, a threaded shank formed on the housing and adapted to extend through a hole in the box top, and a nut for securing the housing to position and the tapered end fixed in a hole therefor provided in said box top.

4. In a device of the character described, a steam generator box, a control housing including a water passage communicating with the box, a water supply tank, a conduit pipe for supplying water from the tank to the housing, a diaphragm mounted to divide the housing into a water chamber and a suction chamber, means for supplying water from the water chamber to the box in limited quantity to be instantly generated into steam, the said means comprising a needle valve secured to the diaphragm to be automatically moved therewith by engine suction and for cooperating with the water passage of the housing in regulating the flow of water therefrom, means for delivering the generated steam into the intake manifold of an engine, and means for causing the steam to engage the highly heated bottom of the box after it has been generated and before it passes into said delivering means, the said means comprising a cross partition wall extending from the top of the box down to a place in close proximity to the bottom of said box.

5. In a device of the character described, a steam generator box, a control housing including a water passage communicating with the box, a water supply tank, a conduit pipe for supplying water from the tank to the housing, a diaphragm mounted to divide the housing into a water chamber and a suction chamber, means for supplying water from the water chamber to the box in limited quantity to be instantly generated into steam, means for effecting communication between the intake manifold of an engine and both the interior of the generator box and the suction chamber, means for causing the steam to engage the highly heated bottom of the box after it has been generated and before it passes into said delivering means, the said means comprising a cross partition wall extending from the top of the box down to a place in close proximity to the bottom of said box.

6. In a device of the character described, a steam generator box of considerable depth, a cross partition in the box extending from the top down to a place in close proximity to the bottom, a housing including a water passage mounted directly on the box with the water passage in communication with the box at one side of the partition, a water supply tank, a conduit for supplying water from the tank to the housing, a cover cap for the housing, a diaphragm adapted to be secured between the cover cap and the housing to cooperate therewith and divide the housing into a water chamber and a suction chamber, said housing having a valve seat adjacent to the water passage, a needle valve in said housing adapted to engage said seat, said needle valve being secured to said diaphragm, said diaphragm being flexible, a member having one end in communication with the suction chamber via the cap and the other end in communication with said steam generator box at the other side of its baffle, a duct from said member to the intake manifold of an engine, and means mounted on the cap and projecting into the suction chamber for limiting the opening movement of said needle valve, substantially as shown and described.

7. In a device of the class described, a steam generator box, a housing including a water passage in communication with the box, a water supply reservoir in communication with said housing to deliver water thereto, a cap for the housing, a flexible diaphragm adapted to be secured between said cap and said housing and divide the same into a water chamber and a suction chamber, said housing having a needle valve seat, a needle valve rigidly secured to said diaphragm and adapted to engage said seat, an adjusting means carried by the cap and projected within the suction chamber for adjusting the stroke of the needle valve, means for effecting communication between said steam generator box and said suction chamber, said means including a member having a tapered end and said box having a tapered socket to receive said end, and a duct from said member to the intake manifold of an engine, all being arranged substantially as shown and described.

THEODORE H. WEINHOUSE.